United States Patent [19]
Copperman et al.

[11] Patent Number: 5,618,178
[45] Date of Patent: *Apr. 8, 1997

[54] VEHICLE SIMULATOR WITH LOW FREQUENCY SOUND FEEDBACK

[75] Inventors: Norman S. Copperman, Palo Alto; Wade O. Winblad, Hayward, both of Calif.

[73] Assignee: Atari Games Corporation, Milpitas, Calif.

[ * ] Notice: The term of this patent shall not extend beyond the expiration date of Pat. No. 5,368,484.

[21] Appl. No.: 334,874

[22] Filed: Nov. 4, 1994

Related U.S. Application Data

[60] Division of Ser. No. 18,950, Feb. 17, 1993, Pat. No. 5,368,484, which is a continuation-in-part of Ser. No. 888,375, May 22, 1992, Pat. No. 5,366,376.

[51] Int. Cl.$^6$ .............................. G09B 19/04; G09B 19/16
[52] U.S. Cl. ................................ 434/62; 434/29; 434/69; 273/442; 381/152
[58] Field of Search ........................... 434/29, 62, 307 R; 364/410, 578; 381/77, 86–89, 188; 188/2 R, 112 A; 273/85 G, 86 E, 437–442, 445, 454, DIG. 28; 463/7

[56] References Cited

U.S. PATENT DOCUMENTS

| | | |
|---|---|---|
| 3,384,719 | 5/1968 | Lanzara . |
| 3,874,743 | 4/1975 | Fleischer et al. . |
| 4,030,208 | 6/1977 | Carver et al. . |
| 4,077,138 | 3/1978 | Foerst . |
| 4,150,497 | 4/1979 | Weber . |
| 4,354,067 | 10/1982 | Yamada et al. . |

(List continued on next page.)

FOREIGN PATENT DOCUMENTS

| | | |
|---|---|---|
| 0183497 | 6/1986 | European Pat. Off. . |
| 2491660 | 4/1982 | France . |
| 8901912 | 2/1991 | Netherlands ............................. 434/71 |
| 2159111 | 11/1985 | United Kingdom . |
| 9202915 | 2/1992 | WIPO . |
| 9202916 | 2/1992 | WIPO . |

OTHER PUBLICATIONS

Atari Games Corporation, "Hard Drivin'" brochure, 1988.
Atari Games Corporation, "Hard Drivin'" Operator's Manual, 1989, pp. ii, 1–4, and 1–5.
J.D. Foley and A. Van Dam, *Fundamentals of Interactive Computer Graphics*, pp. 575–577.

Primary Examiner—Joe Cheng
Attorney, Agent, or Firm—Knobbe Martens Olson & Bear, LLP

[57] ABSTRACT

A driver training system for a user of a simulated vehicle. The system includes input devices for controlling the simulated vehicle, a video display having three dimensional graphics, a computer, modeling software for determining position information based on the input devices, atmospheric effects software to simulate time-of-day and weather conditions, and realistic operating feedback software for simulating on the input devices the feedback normally experienced with operating the vehicle. One aspect of the preferred embodiment is a system including a low frequency speaker mounted on an enclosure adjacent to the simulation user's seat through which road feel cues such as hitting an object are transmitted to the user in response to signals received from the computer. Another aspect of the invention is the a system for simulating the feel to the user of anti-lock brakes on a brake pedal in response to signals received the computer.

26 Claims, 7 Drawing Sheets

Microfiche Appendix Included
(149 Microfiche, 3 Pages)

U.S. PATENT DOCUMENTS

| | | |
|---|---|---|
| 4,383,827 | 5/1983 | Foerst . |
| 4,464,117 | 8/1984 | Foerst . |
| 4,574,391 | 3/1986 | Morishima . |
| 4,671,577 | 6/1987 | Woods . |
| 4,716,458 | 12/1987 | Heitzman et al. . |
| 4,750,888 | 6/1988 | Allard et al. . |
| 4,778,027 | 10/1988 | Taylor . |
| 4,817,948 | 4/1989 | Simonelli . |
| 4,943,938 | 7/1990 | Aoshima et al. . |
| 4,949,119 | 8/1990 | Moncrief et al. . |
| 4,960,117 | 10/1990 | Moncrief et al. . |
| 5,005,148 | 4/1991 | Behensky et al. . |
| 5,044,956 | 9/1991 | Behensky et al. . |
| 5,101,810 | 4/1992 | Skille et al. . |
| 5,113,852 | 5/1992 | Murtonen ................................. 128/33 |
| 5,116,051 | 5/1992 | Moncrief et al. . |
| 5,193,118 | 3/1993 | Latham-Brown et al. . |
| 5,197,003 | 3/1993 | Moncrief et al. . |
| 5,203,563 | 4/1993 | Loper, III . |
| 5,240,417 | 8/1993 | Smithson et al. . |
| 5,269,687 | 12/1993 | Mott et al. . |
| 5,299,810 | 4/1994 | Pierce et al. . |
| 5,354,202 | 10/1994 | Moncrief et al. . |
| 5,364,271 | 11/1994 | Aknin et al. . |

VEHICLE SIMULATOR WITH LOW FREQUENCY SOUND FEEDBACK

RELATED APPLICATIONS

This application is a division of application Ser. No. 08/018,950, filed Feb. 17, 1993, entitled "Vehicle Simulator with Realistic Operating Feedback," now U.S. Pat. No. 5,368,484 which is a continuation-in-part of application Ser. No. 07/888,375 filed May 22, 1992, entitled "Driver Training System and Method with Performance data Feedback" now U.S. Pat. No. 5,366,376.

MICROFICHE APPENDIX

A microfiche appendix containing computer source code is attached. The microfiche appendix comprises three (3) sheets of microfiche having 149 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention generally relates to vehicle simulators and, more particularly, is concerned with realistically simulating to the user the feeling of the vehicle controls and the vehicle ride as it moves within the simulated universe.

2. Background of the Invention

A vehicle simulator can be defined as a system that simulates the operating conditions of a vehicle in an environment. Where the vehicle simulated is an automobile, the vehicle will usually include the typical automobile controls such as a steering wheel, a gear shift, an accelerator pedal, and a brake pedal. Generally, this vehicle will be simulated in an environment which will typically include a road.

Vehicle simulators provide a means to efficiently train operators of a vehicle. The operator of a vehicle can safely learn, from the simulator, how the vehicle will operate in a given set of conditions without actually exposing the operator to any of the risks inherent in real world operation of the vehicle. The experience garnered through making mistakes on a simulator is invaluable when compared to the inherent risks of vehicle damage and operator injury associated with making a driving error in a real-life situation. For example, in a police training application, a student could learn the limits of a police cruiser or guidelines for pursuit, and be tested in these areas without any of the associated risks of real-life training.

In addition to concerns relating to operator safety and vehicle damage, training through actual vehicle operation has other pitfalls. In particular, the cost of instructor time may be prohibitive. Furthermore, a specific vehicle such as a space or underwater vehicle, may simply not be available for training purposes.

To enhance the effectiveness of the training afforded by vehicle simulators, there is a need to ensure that the simulator realistically simulates both the feel of operating the vehicle, as well as realistically simulating the effect of operating the various vehicle controls, in specific situations. Realistically simulating the feel of operating a vehicle includes simulating the feel of the vehicle as it travels in a simulated environment as well as simulating the feel of the various vehicle controls during actual usage.

In automobile simulators the effectiveness of the training given by the simulator would be enhanced if the simulator could translate to the operator the feeling of a wide variety of road surfaces and objects that an automobile is likely to come in contact with. Specifically, there is a need for a system that will generate a wide variety of road feel cues based on where the simulated automobile is within a simulated universe and what the simulated automobile contacts within that universe.

One example of where a prior art simulator has attempted to simulate the feeling of a vehicle operating in an environment is shown in U.S. Pat. No. 4,574,391 to Morishima. Morishima discloses a sound system for a video game, configured for giving a live action feeling to a game involving artillery. This sound system includes several audio speakers mounted around the user's head as well as a low frequency speaker mounted underneath the user's seat. The live action feeling is generated by having the audio speakers generating artillery sound in sequence thereby creating the illusion of the artillery shell approaching and, when the round hits, sending low frequency components of the explosion sound to the low frequency speaker mounted underneath the user's seat. The low frequency speaker then causes the seat to vibrate as a direct result of an explosion sound.

One shortcoming of the system disclosed in Morishima is that the seat vibration and the sound of the explosion are not generated independently. That is, the vibration is a direct result of the low frequency components of the sound of the explosion. Generating physical feedback by transmitting the low frequency component of an associated sound limits such feedback to only sound events having a sufficiently large low frequency component to cause the seat to vibrate. Consequently, the feel of events which occur during the simulation which do not have a large low frequency component cannot be represented to the user. Hence, there is a present need for a system which is capable of simulating a vehicle in a specific environment and, which is capable of providing physical feedback based on a variety of simulated events which are not always accompanied by a sound including a large low frequency component.

In automobile simulators, the effectiveness of the training given by the simulator would be further enhanced if the feel of the brake pedal to the operator closely approximated the feel of an actual brake pedal in an actual car when the brake pedal is depressed. Further, the effect of depressing the brake pedal a given amount in the automobile simulator, as perceived by the operator (or user), should also closely approximate the effect that depressing the brake pedal the same amount has in a real-life automobile.

Many of today's automobiles are equipped with Anti-Lock Brake (ABS) systems. An ABS system is a safety feature added to automobiles to enhance the controllability of automobiles during braking maneuvers. When non-ABS brakes are suddenly applied, or applied with great force, the brakes may lock up and consequently the automobile will often enter into an uncontrollable skid. An automobile tire will skid over pavement when the forward momentum of the automobile exceeds the velocity of the tire, thereby dragging the tire forward over the pavement in a skidding fashion. An ABS braking system acts to prevent such uncontrollable skids by sensing when the tire is being dragged over the pavement, and then decreasing the amount of stopping pressure exerted by the brakes against the wheel by an amount just sufficient to permit the tire to continue to roll over the pavement while still slowing the rotation of the tire. The ABS system will then typically oscillate between increasing and decreasing the amount of braking force exerted against the tire as the ABS system tries to slow the rotational velocity of the tires, while also preventing the brakes from locking up. This oscillation results in a unique, vibratory pulsation of the brake pedal during braking.

Currently, no known vehicle simulators simulate the feel, or the effect, of ABS brakes. However, a person driving an automobile equipped with ABS brakes may become startled when they first experience the feeling of a brake pedal of a vehicle which is equipped with ABS brakes and, as a consequence, stop braking the vehicle when braking is necessary. Hence, the lack of a simulator which will simulate an automobile equipped with ABS brakes represents an additional shortcoming in the prior art relating to driving training simulators.

SUMMARY OF THE INVENTION

The aforementioned needs are satisfied by the present invention which is implemented on a driver training system for a user of a simulated vehicle. This driver training system is comprised of a plurality of simulated input devices for controlling the operation of the simulated vehicle, and includes a video display for presenting the user with a view of a simulated environment, and a means responsive to the input from the input devices for modeling the position and the operating characteristics of the vehicle within the simulated environment.

In one preferred embodiment of this invention the simulated vehicle is an automobile. The system of this embodiment includes means for determining when the vehicle in the simulated universe is at a point where a road cue should be transmitted to the user. At this point the system recalls a digital signal of the road cue out of a memory, translates it into an analog signal, which is then low pass filtered and amplified. The amplified low frequency signal is then sent to a low frequency speaker where the speaker's diaphragm is in communication with a body of air confined within an enclosure coupled to a user's seat. The signal will then cause the speaker diaphragm to vibrate which in turn causes the air within the enclosure to translate and be compressed. The compression and translation of the air within the enclosure causes a semi-rigid diaphragm consisting of a piece of flexible material, which is an integral part of the enclosure, to vibrate. Since the seat upon which the user sits is coupled to the semi-rigid diaphragm, vibrations of the semi-rigid diaphragm will be felt by the user.

In another aspect of this invention, there is a system which is configured for use with automobiles, which will sense when the user of the simulator has applied the brakes in such a manner that an ABS braking system would be activated in a real-world automobile. This system then will induce mechanical vibrations and pulsations on the brake pedal, to simulate the brake pedal response that occurs under the same braking conditions in a real-world automobile that is equipped with ABS brakes.

DETAILED DESCRIPTION OF THE PREFERRED EMBODIMENTS

Reference is now made to the drawings wherein like numerals refer to like parts throughout.

Figure 1:
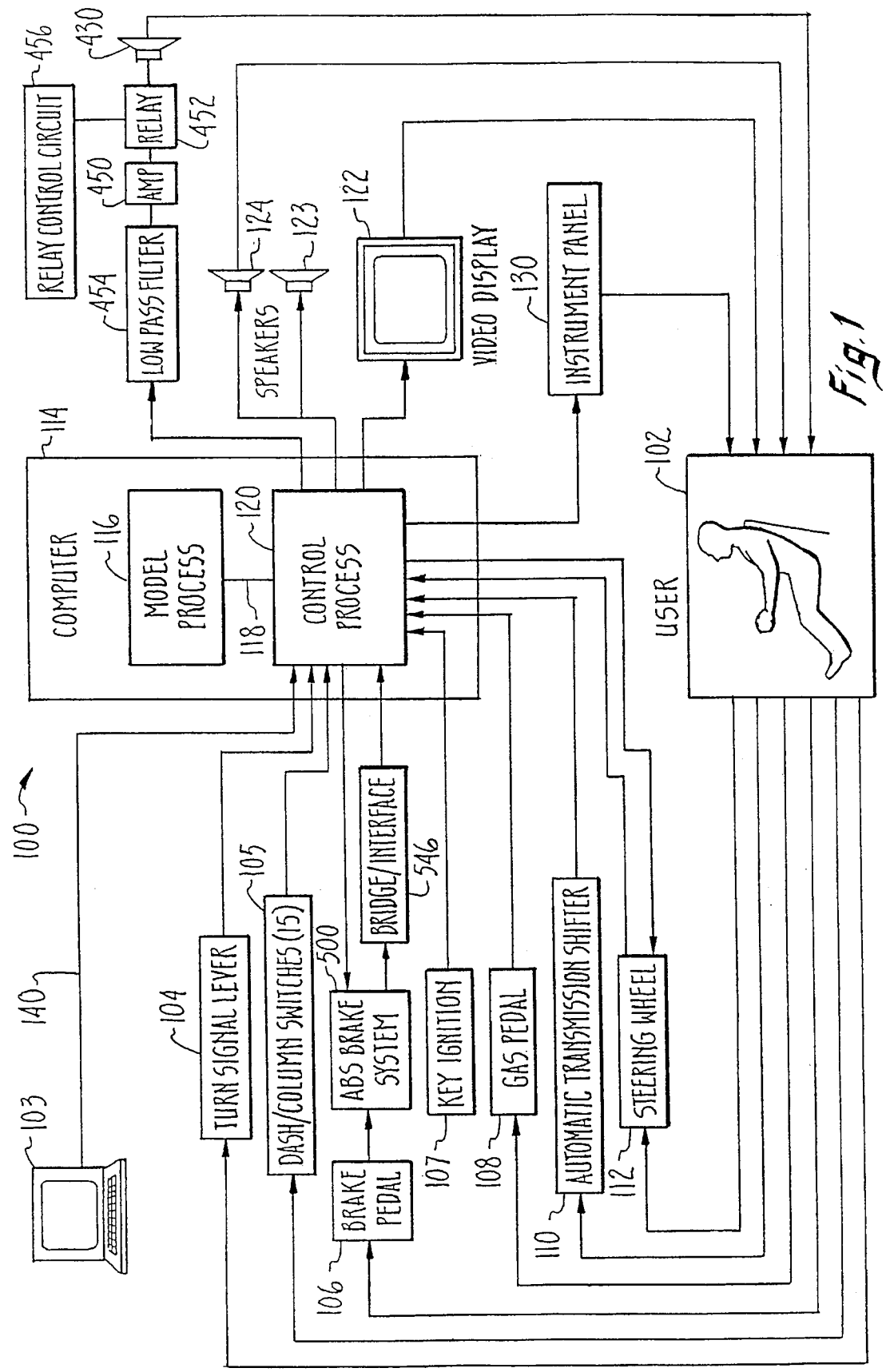
FIG. 1 is a block diagram of one presently preferred driver training system of the present invention.

FIG. 1 shows one presently preferred embodiment of a driver training system 100 of the present invention. The driver training system 100 is operated by a user 102 (shown schematically), who desires to improve driving performance. It should be understood that the driver training system 100 as hereinafter described is applicable to any type of vehicle that is operated by a human. The present invention includes simulations which are easily generalized to driver training systems for all kinds of simulated vehicles and all types of driving.

The more specific embodiment of the driver training system 100 as presented in the following figures and description comprises a vehicle simulator for police training. At times, the user 102 can be an instructor or a student.

In FIG. 1, the user 102 preferably sits in a booth or housing (not shown) such as the one described in the assignee's U.S. patent entitled "Rear Entry Booth and Adjustable Seat Apparatus for a Sit-Down Arcade Video Game," U.S. Pat. No. 4,960,117. In that way, distractions are minimized and the user 102 can concentrate on self-improvement of his driving technique.

In the driver training system 100, the user 102 moves a turn signal lever 104, manipulates a plurality of dash and column switches 105, manipulates a key turned ignition switch 107 for starting the simulated automobile, depresses a brake pedal 106 which is part of an ABS brake simulation system 500 and depresses a gas pedal 108 in the customary manner. In addition, an automatic transmission shifter 110 is manipulated by the user 102 to select a reverse gear or one of a plurality of forward gears. A steering wheel 112 is turned by the user 102 so as to guide the simulated vehicle in the desired direction of travel.

The mechanical inputs provided by the user 102 to the input devices 104, 105, 108, 110 and 112 are translated by transducers into electrical signals which are fed into a computer 114. The mechanical inputs on the brake pedal 106 are translated into electrical signals by the ABS brake system 500 and the signals are fed to a bridge interface circuit 546 connected to the computer 114. The computer 114 further receives both inputs and downloaded programs from a personal computer (PC) 103 which is preferably an IBM compatible computer having a 100 megabyte hard drive and a 4 megabyte RAM. The personal computer 103 and the computer 114 are interactively connected via a communication link 140. The link 140 should be capable of handling high speed digital data transmissions, on the order of 10 megabits per second, and it preferably includes a communication circuit such as an ADSP 2105 or 2101 manufactured by Analog Devices to ensure sufficiently rapid communication between the computer 114 and the personal computer 103.

In the presently preferred embodiment, the computer 114 includes a general purpose microprocessor such as a Motorola 68000 (not shown) or another member of the Motorola 680x0 microprocessor family. One function of the 68000 microprocessor is palette manipulation. In addition to the 68000 microprocessor, the computer 114 preferably includes a model processor (DSP), such as an AT&T DSP32C, a digital signal processor (ADSP), such as an Analog Devices ADSP-2101, and a graphics processor (GSP) such as a Texas Instruments 34010 Graphic System Processor, none of which are shown. The DSP performs velocity, acceleration, and position calculations. The ADSP provides the "higher-level" functions of video display such as translation, rotation, scaling, and shading while the GSP efficiently performs dither patterning, rendering, and the low-level graphics work of writing polygons (so-called polygon graphics) to the video display 122.

The presently preferred computer 114 also includes a read only memory (ROM) comprising 256 kilobytes of storage for self test; as well as a random access memory (RAM) comprising: 1.75 megabytes for downloaded programs, object definition data, and graphics universe data, an additional 0.5 megabytes of shared memory for additional downloaded graphics object data, shared with the 68000 processor. The center monitor in the video display 122 (FIG. 1) also includes an additional 1 megabyte of RAM for downloaded scenario traffic data. Furthermore, the presently preferred computer 114 also incorporates additional random access memories for each processor as follows: DSP—64 kilobytes; ADSP—12 kilobytes of program memory (for the programs downloaded from the personal computer 103), 16 kilobytes of buffer memory; and GSP—45 kilobytes of program memory (for the programs downloaded from the RAM or the personal computer 103) and 640 kilobytes of display memory. The GSP further employs video random access memory (VRAM) for improved video display rates.

The computer 114 executes computer software which is stored in a memory (not shown) such as a 128×8K, 70–100 nsec Random Access Memory (RAM). The software executed by the computer 114 that is stored in this RAM can be one of a number of software scenarios of programs relating to driving stored within the PC 103 which can be downloaded into the RAM in response to commands executed at the PC 103. The computer software executed by the computer 114 is logically organized to include a control process 120.

Figure 5:
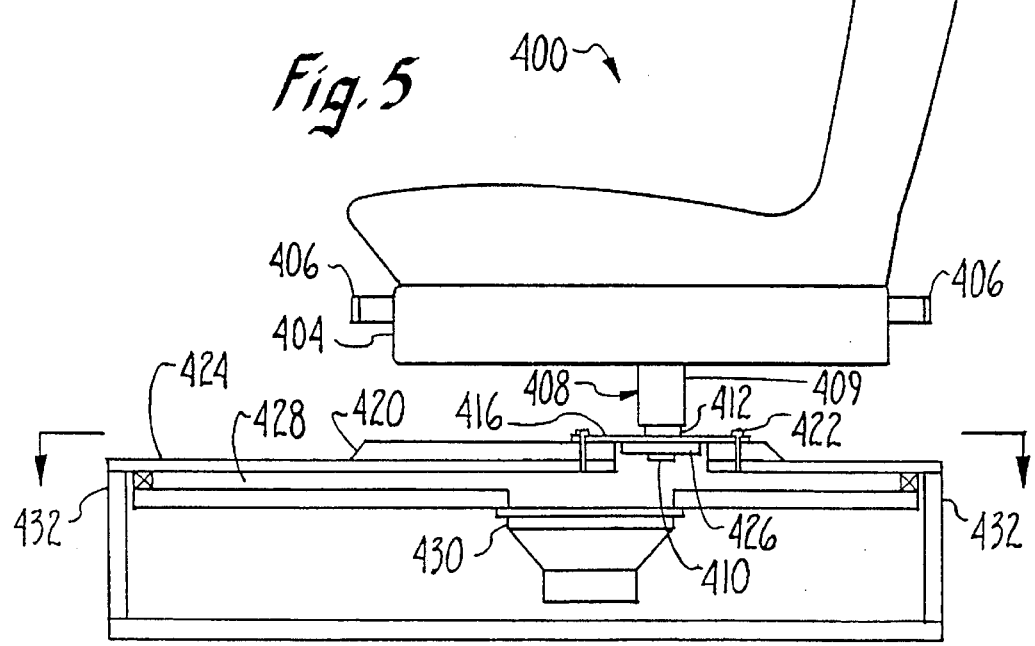
FIG. 5 is a side elevational view of one presently preferred embodiment of a seat and low frequency speaker assembly for the driver training system wherein the speaker is mounted in a floor mounted base, shown in cross-section, under the seat.
Figure 8:
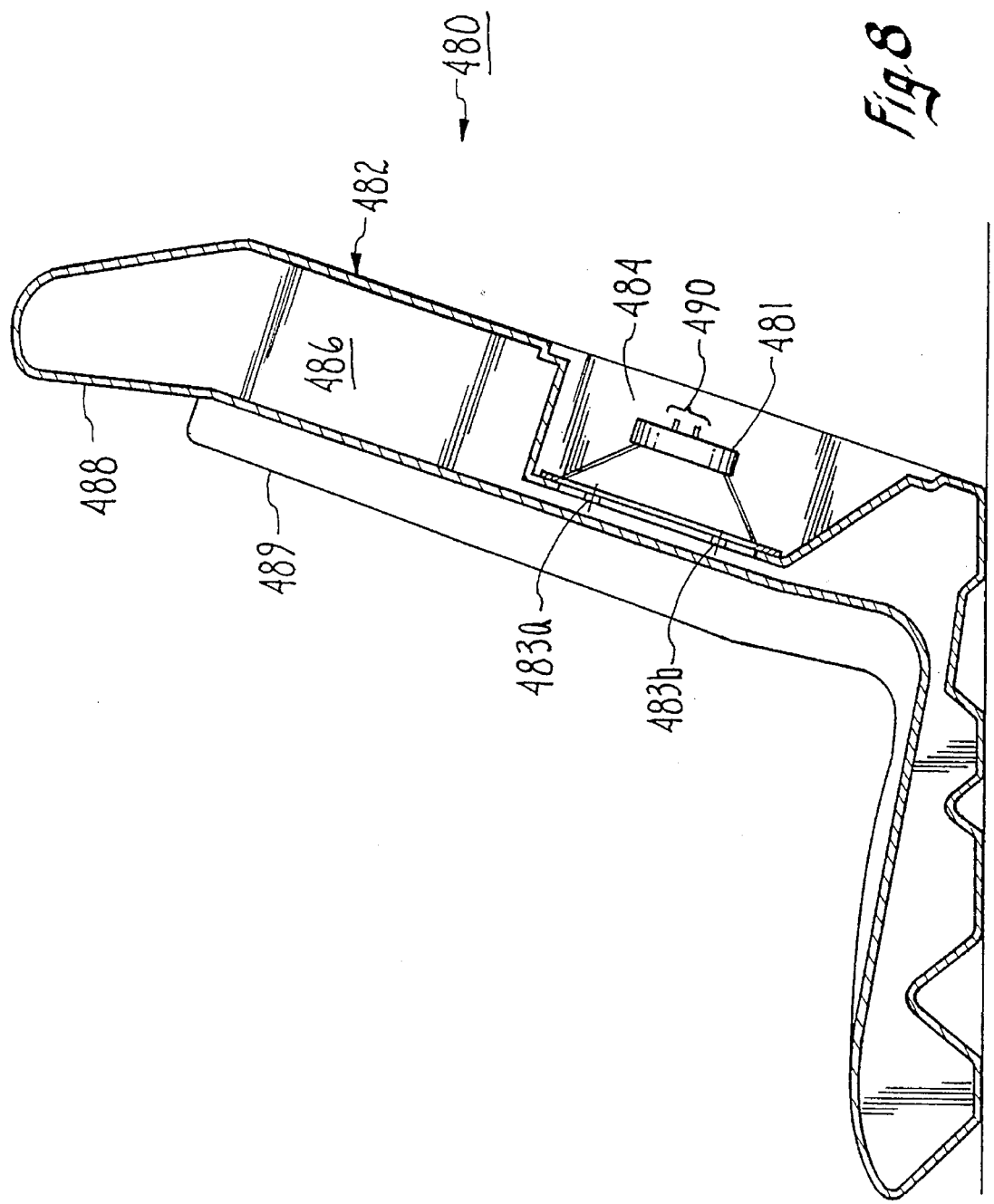
FIG. 8 is a side elevational view of another presently preferred embodiment of a seat and low frequency speaker assembly for the driver training system of the present invention wherein the speaker is mounted in the back of the seat.

The control process 120 receives digitized signals from the input devices 104–112 as well as other digitized input signals from the personal computer 103. The control process 120 then passes data from these digitized signals, across a data path 118, to a model process 116 that models the velocity and acceleration vectors of the simulated car. Thus, at a time T, position data, i.e., the Cartesian coordinates of the car, are determined by the model process 116. The position data is made available, across the data path 118, back to the control process 120. Accordingly, the control process 120 applies the "rules of the road" to the new position of the car, and initiates signals to drive a video display 122, a pair of speakers 123 and 124, a low pass filter 454 and an instrument panel 130. The filter 454 provides a low pass filtered signal to an amplifier 450 which is connected to a relay 452, which in turn is connected to a speaker 430 positioned adjacent to a user's seat 402 (FIGS. 5 and 8). The relay 452 is preferably a low voltage relay manufactured by Potter & Brumfield, model no. T70L5D, and is further coupled to a relay control circuit 456 which disconnects the speaker 430 when the system 100 is either powering up or down.

The control process 120 further provides a user viewpoint into a graphical representation of the vehicle universe. In the preferred vehicle simulation embodiment, the computer 114 generates polygon graphics to the video display 122. One preferred video display device, such as model no. 25K7191 available from Wells-Gardner of Chicago, Ill., is a multi-synchronous display that can be configured to display 512× 288 pixels. The video display 122 may include a plurality of video devices arranged in a semi-circle to give the user 102 a simulated view similar to that of a real car. This arrangement is described in the assignee's copending U.S. patent application entitled "Modular Display Simulator," Ser. No. 07/704,373

The video display 122 preferably generates a color, three-dimensional graphical representation of the environment, i.e., the user's perspective of a graphical universe including items such as a roadway. The speakers 123 and 124 produce sounds such as gear changes, engine revving, skidding, and so on. The low frequency speaker 430 is preferably mounted adjacent to the seat 402 (FIG. 5) to simulate feel of the road. The instrument panel 130 includes a speedometer to indicate the speed of the simulated vehicle, an indicator for the gear selected by using the shifter 110, left and right arrow lights to indicate a direction selected by using the turn signal lever 104, and various other indicator lights. Thus, the user 102 is presented with real-time feedback from the output devices 122, 123, 124, 130 and 430 that is personalized according to his own individual performance and what he encounters in the simulated universe.

The control process 120 further provides feedback to simulate the feeling of a steering wheel in a real automobile while being driven. This is preferably accomplished in the same manner as described in assignee's patent "Control Device such as a Steering Wheel for Video Vehicle Simulator With Realistic Feedback Forces", U.S. Pat. No. 5,044,956. The control process 120, in response to inputs from the ABS brake system 500 via a bridge interface circuit 546, also provides feedback to the brake pedal 106 with the ABS brake system 500 thereby simulating the feeling of brakes on an automobile equipped with an ABS braking system on the brake pedal 106.

The basic operation of the simulator system 100 will now be described. A simulation program is downloaded from the personal computer 103 to the computer 114 which will execute the program. The computer 114 then generates a graphics universe to be displayed to the user 102 via the video display 122 along with associated sounds via the speakers 123, 124. The user 102, in response to what he sees in the video display 122 and what he hears from the speakers 123, 124 manipulates the driving controls to thereby drive the simulated vehicle. Basically, the user 102 starts the automobile via the ignition switch 107, puts the automobile in gear via the automatic transmission shifter 110, depresses the gas pedal 108 to make the automobile move, depresses the brake pedal 106 to make the car stop and steers the automobile with the steering wheel 112.

In response to the user inputs provided via the input devices 104–112, the control process 120 of the computer 114 passes data to the model process 116 via the data path 118 which enable the model process 116 to model the velocity and acceleration vectors of the simulated vehicle thereby determining the Cartesian coordinates of the vehicle. This data is then passed back to the control process 120 via the data path 118 and is then used by the control process 120 to provide additional signals to the user 102. For example, the Cartesian coordinates as determined by the model process 116 may determine that the user 102 has driven the simulated vehicle over a cone in the simulated universe, hence the control process 120 causes the speaker 123, 124 to generate an appropriate noise, cause the feeling of hitting a cone to be generated and felt by the user 102, via the low frequency speaker 430, as well as cause the steering wheel 112 to vibrate in the hands of the user 102 in response to hitting the cone. Further, the control process 120 will also provide feedback to the user 102 through the ABS brake system 500 when the user 102 applies the brakes sufficiently hard to enable the system.

Figure 2:
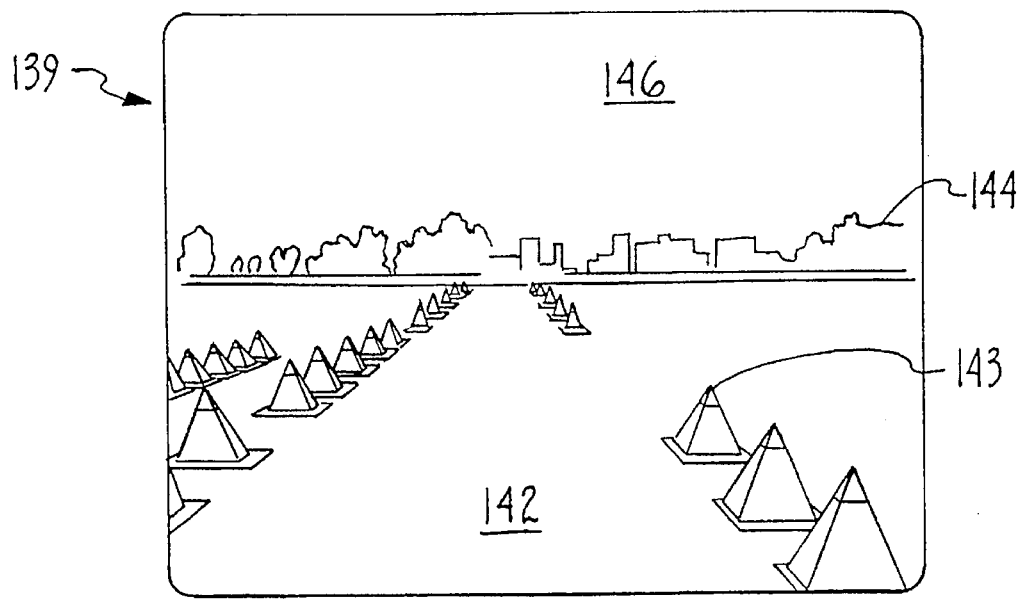
FIG. 2 is a perspective illustration of a user's view while maneuvering through a lane change course on a steering track corresponding to a video screen display provided by the driver training system of FIG. 1.

FIG. 2 is a diagram of a video screen display showing one example of a course upon which the user 102 (FIG. 1) may operate the vehicle. From the first person viewpoint of FIG. 2, it is seen that the user 102 is "placed inside" of the vehicle being simulated. The user 102 views a three-dimensional simulated graphical universe 139 as projected onto the two dimensional screen of the video display 122. The scene represented in FIG. 2 is one wherein the user 102 is looking forward out of a windshield while driving the simulated vehicle and proceeding on the track.

In this embodiment of the present invention, the user 102 is presented with a course 142, which is a specific instance of the universe 139. The user 102 has the basic objective of trying to drive through the course at a desired speed without hitting any obstacles, i.e., a configuration of cones 143. The computer 114 will also cause an appropriate background to be displayed. In the illustrated case, this is a cityscape 144 framed against a blue sky 146. This and other tracks, having different configurations or objectives, e.g., teaching the user 102 how to pursue other cars in traffic, can be selected by the user 102 or downloaded, preferably by an instructor, from the personal computer 103. Since the presently preferred system 100 of the present invention does not use a timer or score points, the user 102 will not feel a need to drive as fast as possible, but instead, will concentrate on learning proper technique.

Figure 3:
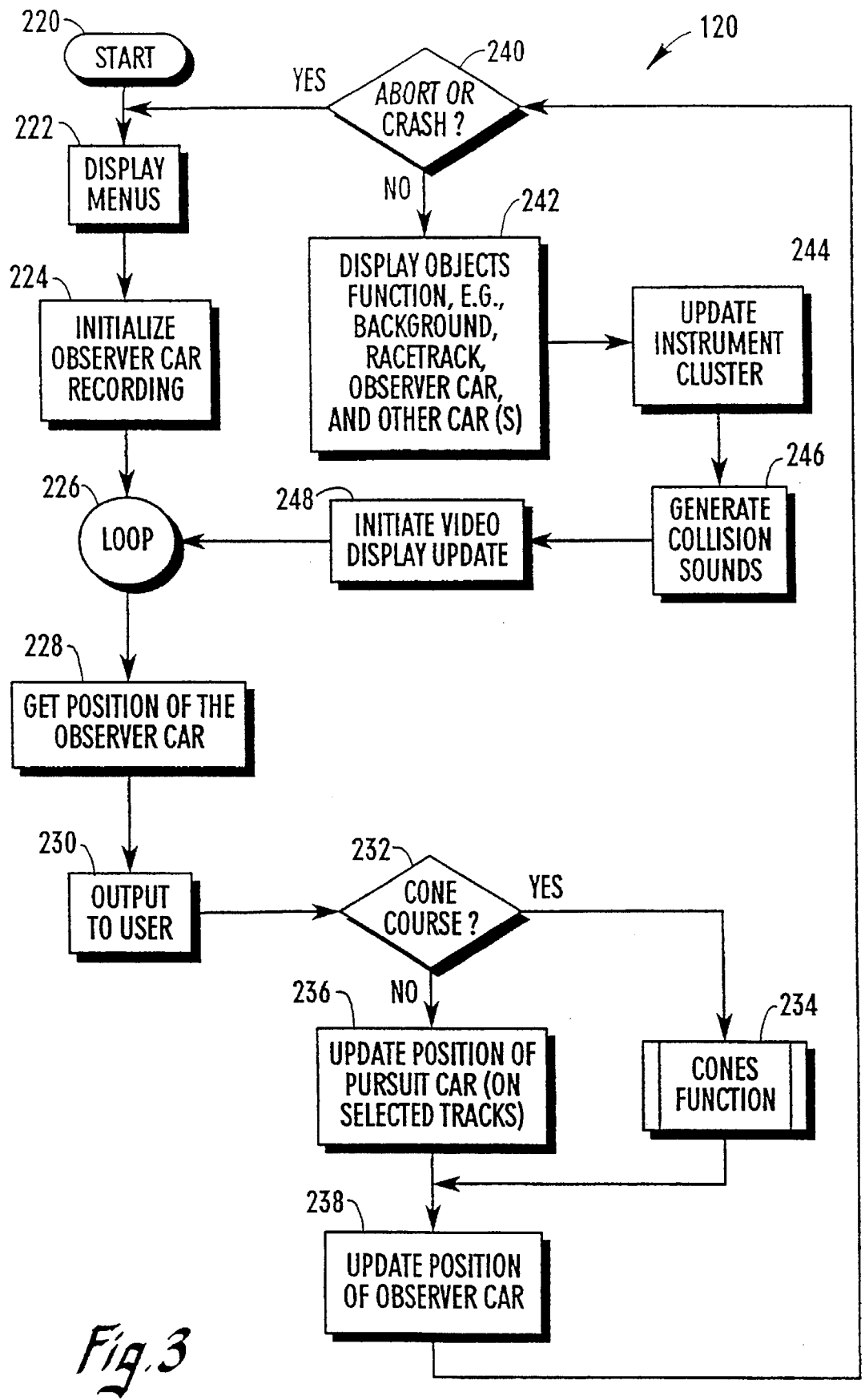
FIG. 3 is a flow diagram of the "executive_control" function which forms a portion of the control process shown in FIG. 1.

FIG. 3 illustrates the flow diagram for the top-level function of the control process 120 (FIG. 1) called "executive_control". In one presently preferred embodiment, the control process 120 is written in the "C" language and cross-compiled using a Green Hills Software, Inc. "C" compiler available from Oasys, a division of Xel, Inc. of Waltham, Mass. The control process 120 is then executed on a Motorola 68000 microprocessor located in the computer 114. However, one skilled in the art of computers will recognize that many other computer languages and computers, including pluralities of each, may be used to achieve the same result. Computer source code of relevant portions of the control process 120 is attached herewith in the accompanying Microfiche Appendix. A portion of the source code that executes on the 68000 microprocessor is listed in the Microfiche Appendix with the title: rpath.c. Another portion of the source code that executes on the 68000 microprocessor is listed in the Microfiche Appendix with the title: pursuit.c.

Prior to a start state 220, a program is downloaded from the computer 103 to the computer 114. The user 102 (FIG. 1) then presses an abort/select rocker switch (not shown) which is one of the column and dash switches 105. Moving to a state 222, the computer 114 (FIG. 1) directs the video display 122 to display a series of menus from which the user may, depending on the program that is being run by the computer 114, select the type of car, or the type of weather. The selection is accomplished by manipulating one or more of the rocker switches (not shown) which are part of the dash and column switches 105. In some of the scenarios or programs that will be downloaded from the computer 103, a series of default choices will be made for the type of vehicle and weather. After selections are made for vehicle and weather, if desired, or the default choices are accepted, the user 102 selects the "start scenario" option and then manipulates a rocker switch (not shown) to signal the computer 114 to move to the next state.

The computer 114 (FIG. 1) then moves from the state 222 to a state 224 where the computer 114 will initiate a process by which the path followed by the observer vehicle in the upcoming scenario will be recorded. This recording can be played back at a later time to permit analysis and critique of the performance of the use during the scenario. The computer 114 moves from the state 224 to a state 226 wherein the computer 114 will perform a loop until the abort/select switch is pressed up (abort) or the user 102 has crashed. The loop, encompassing a series of states 226 through 248, is preferably completed by the computer 114 sufficiently quickly so that position information can be displayed in real-time providing the observer car and environment with fluid movement effects on the video screen 122, the speakers 123, 124, and the low frequency speaker 430.

At a state 228, the position of the observer car is obtained from the model process 116 (FIG. 1). The model process 116 calculates the last position of the observer car based upon the user's inputs which occur asynchronously. Moving to the next state 230, the computer 114 generates output signals including sounds via the speakers 123 and 124, road feel cues via the speaker 430, vibrations on the steering wheel 112 and pulsations on the brake pedal 106 via the ABS system 500.

Next, at a decision state 232, a determination is performed by the computer 114 (FIG. 1) whether the user has selected or been assigned to a cone course. A cone course is a course where the user 102 will drive an automobile on a track containing cones. If a cone course has been selected or assigned, the computer 114 moves on to a "cones" function 234 wherein the user 102 is given choices on performance feedback. If a cone course was not chosen as determined by state 232, the computer 114 proceeds to state 236. At state 236, if the user 102 has selected or been assigned one of the pursuit tracks wherein the user 102 is required to pursue a specific automobile, the pursuit car, through the simulated universe, the recorded position of the pursuit car is updated. This means that the pursuit car is placed in a certain position in the graphical universe or environment 139 (FIG. 2) prior to the display system of the computer 114 (FIG. 1) actually updates the video display 122. Next, at a state 238, the recorded position of the observer car, the car doing the pursuing, is updated by being placed in a certain position in the graphical universe 139. The computer 114 then moves to a decision state 240 where the computer 114 checks to see whether an abort/select rocker switch has been pressed up (abort) or the simulated vehicle has crashed.

Next, moving to a "display_objects" function 242 if the abort switch was not pressed or the car has not crashed, a display command is initiated to the digital signal processor (not shown) in the computer 114 (FIG. 1), such as the ADSP-2101 chip available from Analog Devices of Norwood, Mass. In this function 242, display objects, such as the track, background (houses, etc.), the pursuit car (if on a pursuit track) and the observer car, are appropriately translated in the graphical universe 139 (FIG. 2) according to the perspective of the user 102, for later display on the video display 122.

Moving to a state 244, the instrument panel 130, including the speedometer, turn signal indicators, and various indicator lights, is updated. A separate fuel gauge (not shown) is also updated. Then, at a state 246, collision sounds, sounds associated with the observer car colliding with barriers, cones, buildings and the like, are generated if the computer 114 determines that the simulated vehicle has collided with something. At a state 248, the video display 122 has its three-dimensional graphics display updated by a command being issued to the graphics signal processor such as, for example, the 34010 chip distributed by Texas Instruments, which can handle color filled three-dimensional graphics in real-time. Following the state 248, the computer 114 moves to state 226 to begin the next pass of the loop. Returning to the decision state 240, if abort is selected or if the simulated car has crashed, the current session is terminated and the computer 114 proceeds to state 222 to begin a new session.

Figure 4:
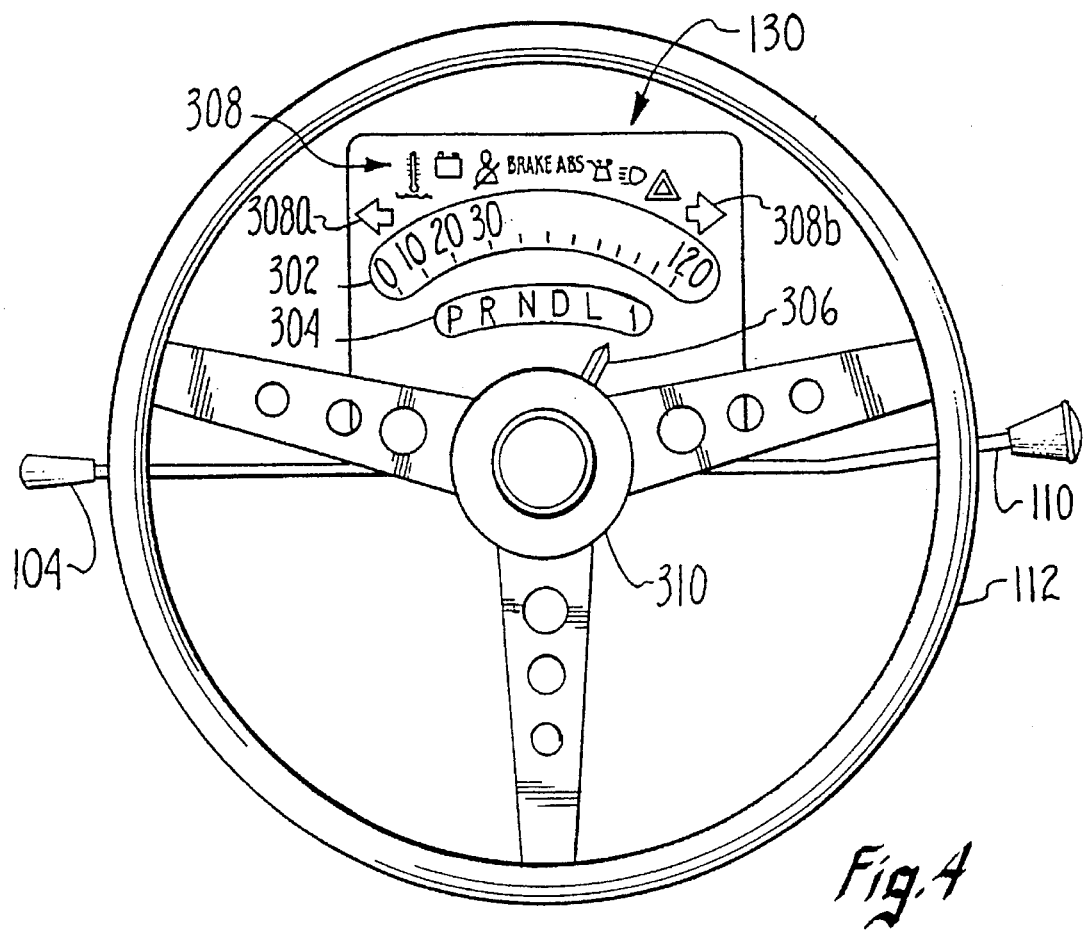
FIG. 4 is a diagram of a set of mechanical input devices and an instrument panel for the simulated vehicle of the driver training system shown in FIG. 1.

The instrument panel 130 of the system 100, as shown in FIG. 4, includes a speedometer 302, a transmission gear indicator display area 304, a transmission gear indicator 306, a indicator and warning light area 308. Several input devices of the system 100, including the turn signal lever 104, the automatic transmission or shift lever 110, and the steering wheel 112, are also shown. The speedometer 302 and indicators become active when the user 102 (FIG. 1) "starts" the simulated vehicle. The speedometer 302 provides a measurement of velocity. The gear indicator 306 visually displays the position of the shift lever 110 upon the gear indicator display area 304. The indicator and warning light area 308 includes the following designators (left to right): left turn signal 308a, temperature, battery, seat belt, brake, oil pressure, high beam (headlights), emergency flasher, and right turn signal 308b. The turn signal lever 104 is mounted on a steering column housing 310.

FIG. 5 is a side elevational diagram of one preferred embodiment of a seat and low frequency speaker assembly 400 shown in partial cross-section. The purpose of the assembly 400 is to provide the user 102 (FIG. 1) with meaningful and realistic road feel cues. The assembly 400 includes a seat 402, preferably made of a light weight plastic or upholstered wood, upon which the user 102 will sit while operating the system. The seat 402 is movably mounted on a housing 404, preferably made of thick metal, containing a seat adjust mechanism (not shown). The seat adjust mechanism can be of any type known in the art which permits the user 102 to adjust the seat 402 into a preferred position relative to the driving controls (not shown). Seat adjustment is accomplished by the user 102 manipulating a seat adjust control 406.

The seat adjust mechanism housing 404 is attached to the top of a mounting post, generally indicated by the reference numeral 408. In this preferred embodiment, the mounting post 408 is cylindrical and preferably made of a solid material such as stainless steel, with a top portion 409 and a bottom portion 410, the bottom portion 410 having a smaller diameter than the top portion 409. A cylindrical bearing 412 is mounted flush on the bottom portion 410 of the mounting-post 408.

The bottom portion 410 of the mounting post 408 extends through a mounting hole 414 (FIG. 6) in a swivel base 416. The mounting hole 414 is preferably 4 inches in diameter which is slightly larger than the outer diameter of the bottom portion 410 of the mounting post 408. The bearing 412 is mounted on the bottom portion 410 of the mounting post 408 such that when the bottom portion 410 extends through the mounting hole 414 the upper surface of the bearing 412 will be positioned between the upper portion 409 and the upper surface of the swivel base 416. The bearing 412 can be of any type known in the art which will facilitate swiveling the seat 402. The swivel base 416 is preferably made of stainless steel and is flushly mounted on top of a seat mounting plate 420 and is primarily secured thereto by four screws 422 (two shown) which extend through the seat mounting plate 420 into a semi-rigid diaphragm 424.

A securing member 426 is attached to the bottom portion 410 of the mounting post 408 underneath the swivel plate 416, such that the securing member 426 prevents the mounting post 408 from being lifted out of the mounting hole 414 while still permitting the seat 402 to swivel. A person skilled in the art can appreciate that the securing member 426 can be comprised of a nut and lock washer used in combination with threads on the bottom portion 410 of the mounting post 408 or any other combination which secures the mounting post 408 in the described fashion while still permitting the seat 402 to be swiveled.

The swivel plate 416 is attached to the seat mounting plate 420, which is preferably a 16 inch by 18.75 inch piece of ¾ inch thick plywood with beveled edges. The seat mounting plate 420 is further attached to the semi-rigid diaphragm 424. The semi-rigid diaphragm 424 is preferably a 29.80 inch by 35.50 inch piece of ½ inch or ⅜ inch thick plywood, the top of which is covered by corrugated rubber matting 425 (FIG. 6) suitable for providing secure footing for the user 102. The semi-rigid diaphragm 424 must be sufficiently flexible so that it can vibrate in response to changes in air pressure induced by the low frequency audio speaker 430 positioned on an adjacent enclosure 428. The operation of the speaker 430 and the enclosure 428 will be discussed in greater detail below.

Connected to the bottom side of the semi-rigid diaphragm 424, at its outside edges, are four vertical support members 432 (two shown). The vertical support members 432, are preferably made from ¾ inch thick particle board, and they are connected to the semi-rigid diaphragm 424 along its outside perimeter so that they extend perpendicularly downward. Connected to the bottom surfaces of the vertical support members 432 is a horizontal support member 434, preferably made from ¾ inch thick particle board, which serves as a base plate for the assembly 400. The length and width dimensions of the horizontal support member 434 are substantially identical to the dimensions of the semi-rigid diaphragm 424 such that when the semi-rigid diaphragm 424, the vertical support members 432 and the horizontal support member 434 are assembled, they form a rectangular box-like structure. Also mounted to the bottom side of the semi-rigid diaphragm 424, parallel to, and inset approximately one inch from each of its outside edges are four cleats 436 (two shown). The four cleats 436 preferably consist of lengths of mahogany wood with a ¾ inch square cross section. Where the cleats 436 intersect near the corners of the semi-rigid diagram 424, they are preferably joined to each other in a substantially air-tight fashion.

Attached to the bottom side of the cleats 436, in a substantially air-tight fashion, is a speaker member 440. The speaker member 440 is preferably a 27.80 inch by 33.50 inch rectangular piece of ¾ inch thick particle board. The speaker member 440 further contains a circular hole 442 with approximately a 7 inch diameter. The speaker 430 is mounted to the underside of the speaker member 440, preferably in a substantially air-tight fashion, so that the diaphragm of the speaker 430 is substantially centered about the hole 442 and is exposed to the air within the enclosure 428. The enclosure 428 is thereby formed by the semi-rigid diaphragm 424, the cleats 436, the speaker member 440, the speaker 430, and the swivel base 416. Preferably, the enclosure 428 is air-tight, however, perfect air-tight integrity is not a requirement for the operation of the assembly 400. In this presently preferred embodiment, the speaker 430 is a model QUAM—NICHOLS, eight inch, 8 Ohm, 50 Watt two terminal woofer speaker part number 92-9846.

Figure 6:
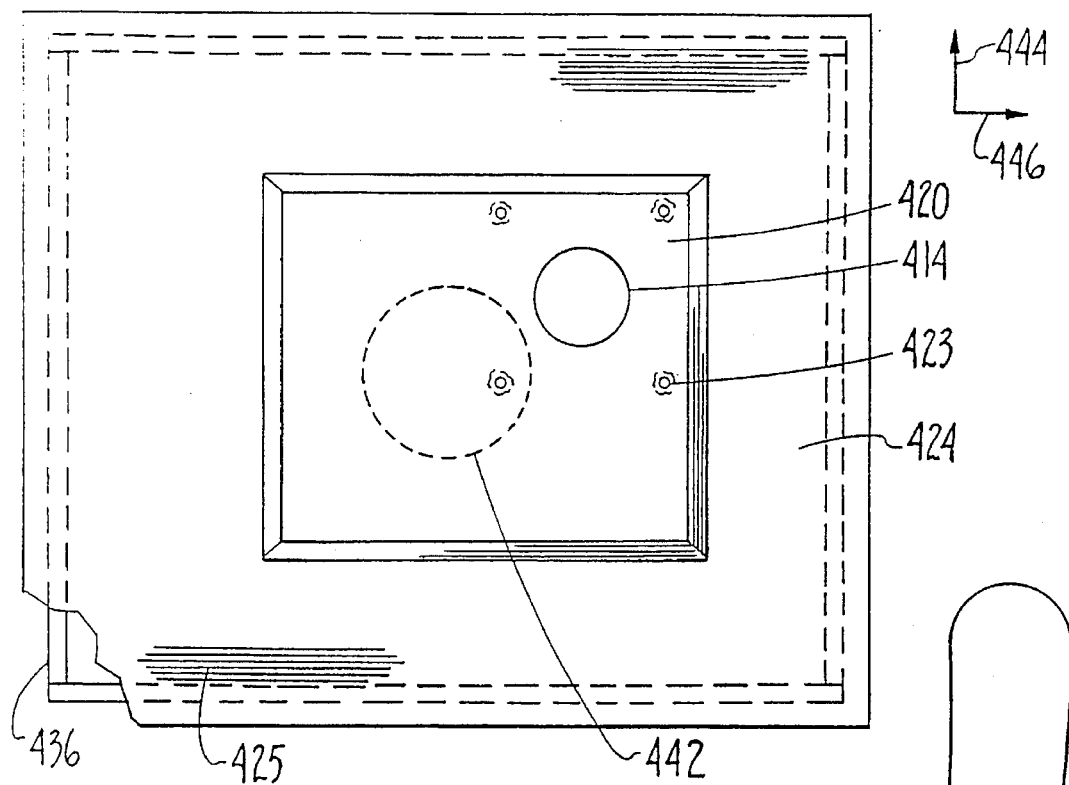
FIG. 6 is a top plan view of the base of the low frequency speaker assembly taken along line 6—6 of FIG. 5.

FIG. 6 is a top plan view of the base portion of the seat and speaker assembly, taken along line 6—6 of FIG. 5. FIG. 6 selectively shows the relative mounting locations and sizes of some of the members which comprise the base containing the speaker 430 and the enclosure 428 of the presently preferred embodiment. For purpose of clarity in the description below, two direction arrows 444 and 446 are shown in FIG. 6. The mounting hole 414 in the plate 420 is preferably offset from the center of the plate 420 by approximately 4 inches in direction of the arrow 446 and approximately 3 inches in the direction of arrow 444. The mounting post 408 (shown in FIG. 5), extends perpendicularly outward from hole 414 and is preferably coupled to the seat adjust mechanism housing 404 (shown in FIG. 5) offset from the center of the housing 404 in the same direction as the arrow 444 by the same distance as the mounting hole 414 is offset in the direction of the arrow 444 from the center of the plate 420.

When the seat 402 is oriented in its nominal operational position, facing in the opposite direction as the arrow 446, as shown in FIG. 5, the seat 402 will be located such that it is centered over the seat mounting plate 420 in the direction of the arrow 444 while being offset approximately 4 inches from being centered over the plate 420 in the direction of the arrow 446. Positioning the seat 402 in this fashion permits easier access to the seat 402 by the user 102 as the seat 402 can be swiveled so when the seat 402 faces in the direction of the arrow 444, the edge of the seat 402 will preferably extend beyond the edge of the semi-rigid diaphragm 424. FIG. 6 also shows the locations of four holes 423 for the four screws 422 which secure the swivel plate 416 (see FIG. 5) to the seat mounting plate 420 and to the semi-rigid diaphragm 424. The speaker hole 442 is located substantially at the center of the speaker member 440 (FIG. 5). As shown in FIG. 6, the hole 442 is then located in the speaker member 440 underneath and at the approximate center of the semi-rigid diaphragm 424. The top surface of the semi-rigid diaphragm 424 is preferably covered by the corrugated rubber matting 425, shown in part in FIG. 6. This matting 425 is preferably fixedly attached to the semi-rigid diaphragm 424 through the use of tacks or glue. Also shown in FIG. 6 are the cleats 436, mounted underneath the semi-rigid diaphragm 424, which are also shown to meet and join each other at their ends.

The basic operation of the assembly 400, will now be explained by referring again to FIG. 1. The control process 120 receives input from the model process 116 indicating that an event, e.g., collision with an object, engine vibration and so forth is occurring. In response, the control process 120 access a digital representation of a signal in a wave table (not shown) stored in one of the RAMs of the computer 114. The wave table stores a well-known digital representation of the frequency content, the amplitude and the duration of the signals corresponding to various events, e.g., collision with specific objects, engine noise. Once a digital representation is accessed, the control process 120 then reproduces the digital representation and causes its translation into an analog signal representative of the specific event which is then fed to the low pass filter 454. Computer source code of relevant portions of the control process 120 which accesses the digital signal is attached herewith in the accompanying Microfiche Appendix.

The filter 454 is a low pass filter with a frequency response of 20 to 80 Hertz (Hz), hence, only signals with a frequency content below 80 Hz will be passed by the filter 454 to the amplifier 450. The amplifier 450 is a 28 Watt power amplifier capable of producing a 24-volt, peak-to-peak output signal at maximum gain. Hence, the amplifier 450 increases the amplitude of the low frequency signal it receives from the low pass filter 454 and feeds this amplified low frequency signal to the relay 452.

The relay 452 is designed to protect the speaker 430 from damage caused by voltage spikes generated by either powering up or powering down the system 100. As is understood in the art, oftentimes when electronic equipment is in a period of power transition, transient voltage spikes are generated which, if transmitted to audio-speakers of a type similar to speaker 430, can result in damage to the speakers. Even if these transients do not damage the speaker 430 they may unsettle the user 102 sitting in the seat 402. Consequently, the relay 452 is connected to the control circuit 456, described below, which will disconnect the speaker 430 from the electrical circuitry of the system 100 during periods of power transition.

Referring now to FIGS. 1, 5 and 6, when the system 100 is not in a period of power transition, the relay 452 will send the high amplitude, low frequency signal received from the amplifier 450 to the speaker 430. The diaphragm of the speaker 430 will then vibrate in response to the high amplitude, low frequency signal, thereby displacing the air within the enclosure 428. This displacement of the air within the enclosure 428 causes the semi-rigid diaphragm 424, which shares common structural components with the enclosure 428, to bounce or vibrate. The vibration of the semi-rigid diaphragm 424 is then communicated through the seat mounting plate 420 and the seat mounting post 408 to the seat 402 and then to the user 102. In this fashion, events such as engine vibration, hitting an object, and so forth can be realistically represented to the user 102 of the simulation system 100.

For example, to simulate the feel of hitting a cone while driving the simulated car on the course 142 shown in FIG. 2, the control process 120 retrieves a wave sample of the sound from the wave table (not shown) and feeds the equivalent analog signal, having a sharp low frequency peak to the filter 454. The filter 454 passes the low frequency content (below 80 Hz) of the signal to the amplifier 450. The amplifier 450 increases the amplitude of the signal and passes it to the relay 452. This high amplitude signal will then be sent to the speaker 430 if the system 100 is not in a period of power transition. The speaker 430 communicates a high excursion pulse through to the air within the enclosure 428 by vibrating the diaphragm of the speaker 430. The resulting displacement and consequent compression of air within the enclosure 428 is transmitted to the semi-rigid diaphragm 424 and ultimately to the user 102 sitting on the seat 402. The user 102 will then experience a quick jolt to simulate the feel of hitting the cone as the speaker diaphragm moves the air in the enclosure 428.

The control process 120 can cause different samples of sound stored in the wave table to be transmitted, in the above-described fashion, to the user 102 for a single event. The low frequency signal generated by the control process 120 for a cone collision may have a duration in the range of 100 milliseconds to one second. Other signals, such as those defining engine vibration may have longer duration. By increasing the number of sound samples stored in the wave table, many other road feel cues may be utilized by the system 100. During the same event the control process provides independent signals to the speakers 123 and 124 which are indicative of engine noises, cone collisions and so forth. Included in the Microfiche Appendix is the source code used by the control process 120 to implement the operation of the wave table herein described.

Figure 7:
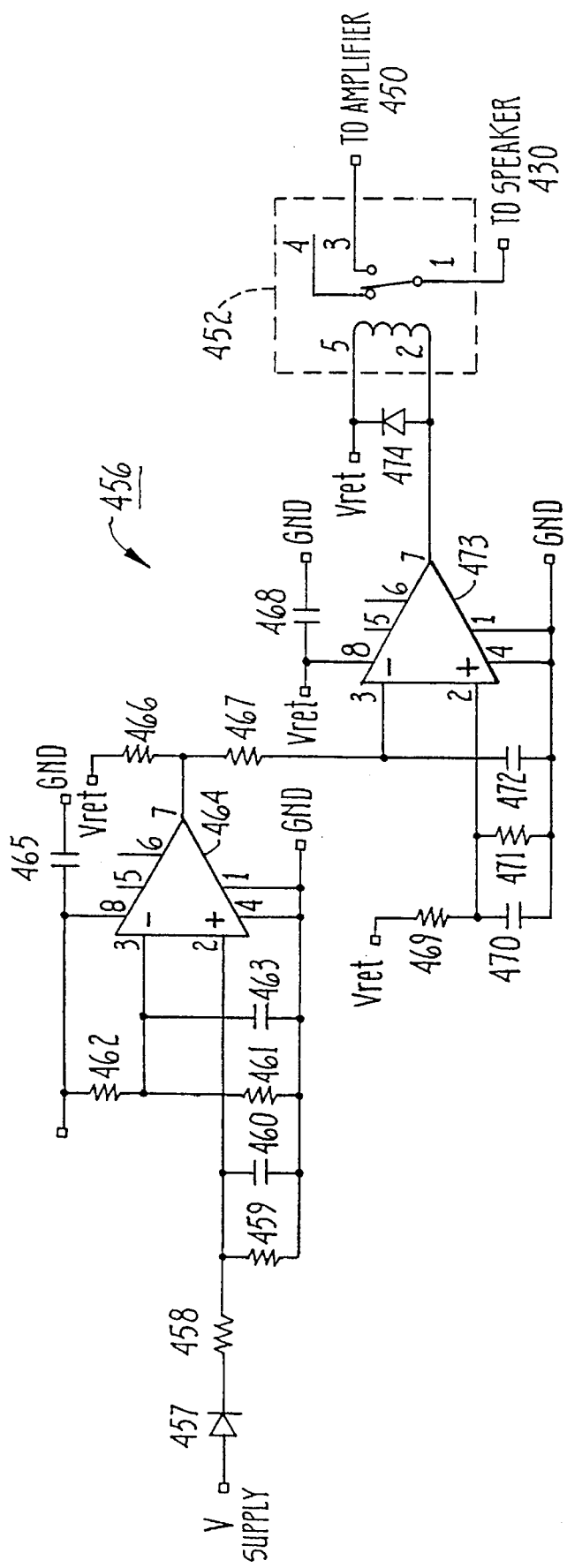
FIG. 7 is an electrical schematic showing one presently preferred embodiment of a relay control circuit which is connected to the low frequency speaker shown in FIG. 5.

The relay control circuit 456 is more fully described by reference to FIG. 7. The relay control circuit 456 is designed to turn the relay 452 off during periods of power transition, e.g., when powering up and when powering down the system 100. The circuit 456 is designed so that when the actual voltage for the system 100 falls below its normal input voltage, preferably 12 VAC, the relay 452 will disconnect the input to the speaker 430 from the output of the amplifier 450. The operation of the circuit 456, shown in FIG. 7 will now be described.

When the system 100 is turned on, an actual voltage is input to a diode 457, this voltage then begins to charge a capacitor 460 coupled to the non-inverting input (+) of a comparator 464. Simultaneously, a capacitor 463, which is connected to the inverting (−) input of the comparator 464 is charged by a reference voltage (Vref), preferably 14 volts, through a resistor 462. A capacitor 470, which is connected to the non-inverting (+) input of a comparator 473, is also charged by the supply voltage (Vsupply) through a resistor 469. When the voltage on the non-inverting (+) input of the comparator 464 exceeds the voltage on the inverting (−) input of the comparator 464, the comparator 464 outputs a high voltage which causes slow charging of capacitor 472 and that appears on the inverting (−) input of comparator 473. When the voltage on the inverting (−) input of the comparator 473 exceeds the voltage on the non-inverting (+) input of comparator 473, the output of the the comparator 473 goes low will then energize the coil of the relay 452 thereby connecting the speaker 430 to the amplifier 450.

When the power to the system 100 is turned off, the circuit 456 operates as follows. The capacitor 460 rapidly discharges dropping the voltage on the non-inverting (+) input of the comparator 464 beneath the voltage on the inverting (−) input of comparator 464 and thereby turning this comparator off. Consequently, a voltage on the inverting (−) input of the comparator 473 will decrease. This results in the comparator 473 turning off as the voltage on the non-inverting (+) input of comparator 473 is greater than the voltage on the inverting (−) input. With the comparator 473 turned off (goes high), the coil of the relay 452 is de-energized, which results in the relay 452 disconnecting the speaker 430 from the amplifier 450.

Preferably, when the system 100 is powering up, the circuit 456 will delay energizing the coil of the relay 452 to connect the speaker 430 to the amplifier 450 for a relatively long time, preferably approximately 4 seconds, thereby permitting any transients which would cause damage to the speaker 430 to dissipate. However, after the system 100 is powered down, it will be desirable to quickly disconnect the coil of the relay 452 from the amplifier 450, preferably within approximately 16 milliseconds, to prevent any transients being transmitted to the speaker 430. Values of one presently preferred embodiment of the component parts of circuit 456 are shown in Table 1 below. When used in the circuit configuration shown in FIG. 7, a suitably long delay turn-on time with a suitably quick turn-off time is achieved.

TABLE 1

| IDENTIFIER | PART | PART NUMBER | VALUE |
|---|---|---|---|
| 464 | Comparator | LM311 | — |
| 473 | Comparator | LM311 | — |
| 457 | Diode | IN4001 | — |
| 474 | Diode | IN4001 | — |
| 458 | Resistor | — | 10kΩ |
| 459 | Resistor | — | 4.7kΩ |
| 461 | Resistor | — | 470Ω |
| 462 | Resistor | — | 10kΩ |
| 466 | Resistor | — | 82kΩ |
| 467 | Resistor | — | 270Ω |
| 469 | Resistor | — | 4.7kΩ |
| 471 | Resistor | — | 2.2 μF |
| 460 | Capacitor | — | 2.2 μF/50VμF |
| 463 | Capacitor | — | 0.1 μF |
| 470 | Capacitor | — | 0.1 μF |
| 472 | Capacitor | — | 0.1 μF |
| 465 | Capacitor | — | 47 μF |
| 468 | Capacitor | — | 0.1 μF |

FIG. 8 is a side elevational diagram showing a cross section of another preferred embodiment of a seat and low frequency speaker assembly 480. The purpose of the assembly 480 is also to provide the user 102 (FIG. 1) with meaningful and realistic road feel cues. The assembly 480 includes a seat 482 that has at least a portion of its interior hollow with a recess 484. The recess 484 has the low frequency speaker 481 which is connected to the simulation system 100 in the same manner as is the speaker 430 (FIG. 1) mounted and secured such that a diaphragm of the speaker 481 is in communication with the air that is enclosed in the envelope or bladder 486 of the seat. The diaphragm of speaker 481 moves back and forth in a conventional manner in response to a signal presented at the speaker terminals. This back and forth motion is communicated through the air creating vibration on the surfaces 488 of the seat 482. The surfaces 488 are made of a somewhat flexible but strong plastic material. The back and bottom surfaces are somewhat thicker and hence stiffer, while the surfaces in contact with the user 102 (FIG. 1) are thinner to flex in response to the vibration of the air. The surfaces in contact with the user 102 may be overlaid with a cover and cushion 489.

The speaker 481 of this presently preferred embodiment is a model 40-1348 dual-coil eight inch speaker sold by Radio Shack. The speaker 481 has four terminals, a first set of terminals 490 is visible in FIG. 8. The speaker 481 is fastened to the seat 482 by four bolts, the locations of two are indicated by a pair of holes 483a and 483b. The speaker 481 is connected to the control process 120 (FIG. 1) of the system 100 through the relay 452, the amplifier 450, and the low pass filter 454 in the same fashion as was the speaker 430 in the preferred embodiment shown in FIGS. 5 and 6 and it receives signals indicative of road feel cues in the same fashion as described above.

Figure 9:
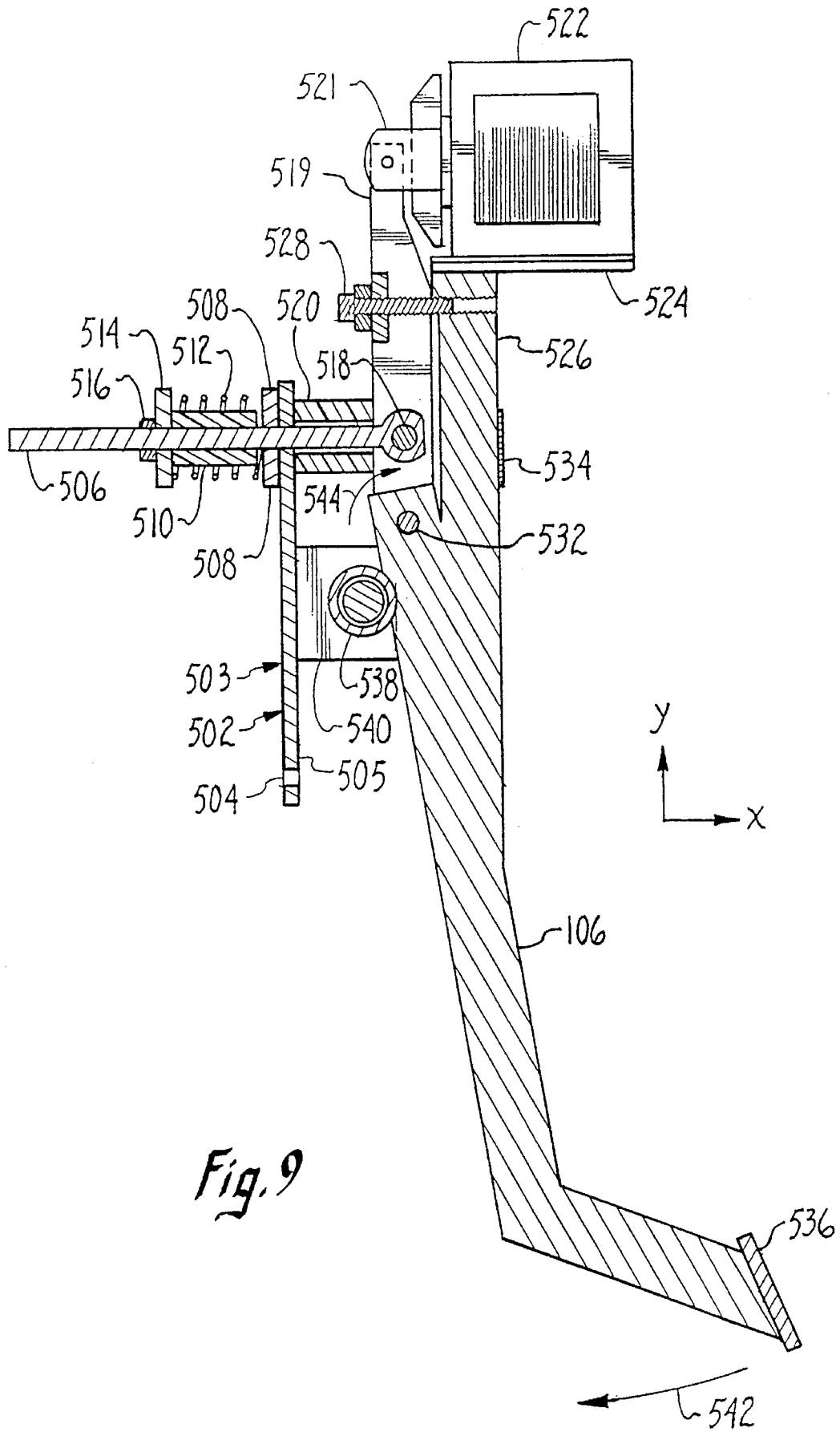
FIG. 9 is a cross-sectional side view of the mechanical structure of one presently preferred embodiment of an ABS brake simulation assembly of the present invention.

FIG. 9 shows a cross-sectional view of the ABS brake pedal system 500 with the attached brake pedal 106 of the preferred embodiment of the present invention shown in FIG. 1. The ABS brake pedal system 500 is mechanically arranged so that the brake pedal 106 provides for movement which simulates the movement of a brake pedal in a real automobile.

The ABS brake pedal system 500 includes a mounting plate 502 having a back side 503 and a front side 505. The mounting plate includes a plurality of mounting holes 504 (two shown) through which screws (not shown) are used to secure the ABS brake pedal system 500 to the housing (not shown) of the simulator system 100 in a similar orientation as brake pedals in a typical automobile.

A connector rod 506 extends through a hole in the mounting plate 502. The portion of the connector rod 506 extending out from the back side 503 of the mounting plate 502 is preferably threaded. Coupled to the threaded portion of the connector rod 506 is a washer 508 which is positioned on the connector rod 506 so as to be sitting adjacent to the back side 503 of the mounting plate 502. A cylindrical elastic bumper 510 having an opening slightly larger than the diameter of the connector rod 506, and a spring 512 are both positioned on the threaded portion of the connector rod 506 adjacent to the washer 508. The inner diameter of the spring 512 is slightly larger than the outer diameter of the bumper 510 so that when the bumper 510 is positioned on the connector rod 506, the spring 512 is then mounted over the bumper 510. A washer 514, capable of retaining and compressing the spring 512, is also positioned on the connector rod 506 so that the spring 512 and the elastic bumper 510 are positioned in axial alignment with the connector rod 506 between the washer 514 and the washer 508. The spring 512 is longer than the elastic bumper 510 so that the spring 512 will have to be compressed before the elastic bumper 510 can make contact with both of the washers 508 and 514 at the same time. A nut 516 adjustably secures the washer 514 to a specified position on the connector rod 506.

The portion of the connector rod 506 which projects out from the front 505 of the mounting plate 502 is connected to a cross piece 518 which, in turn, connects two identical force multiplier arms 519 (one shown). An elastic rebound bumper 520 is positioned on the portion of the connecting rod 506 between the mounting plate 502 and the cross piece 518. The top end of each of the force multiplier arms 519 is respectively bolted to one of two arms 521 of an electrically controlled solenoid 522 in such a manner that when current is supplied to the solenoid 522, the force multiplier arms 519 move in response thereto.

An adjustment screw 528 is also mounted on another cross-piece (not shown) connected between the force multiplier arms 519. The adjustment screw 528 extends through the cross piece connecting the force multiplier arms 519 to a lever arm 526. The adjustment screw 528 permits the user 102 to adjust the amount of motion of the force multiplier arms 519, relative to the lever arm 526, induced by the solenoid 522. Hence, tightening the adjustment screw 528 will decreases the amount by which the force multiplier arms can travel relative to the lever arm 526. The bottom ends of both of the force multiplier arms 519 are connected via a bolt 532 and a nut (not shown) to a brake pedal member 530. The solenoid 522 is secured to the top of a plate 524, the bottom surface of the plate 524 is, in turn, secured to a lever arm 526 which projects perpendicularly downward from the plate 524.

The lever arm 526 is welded near its bottom end to the brake pedal member 530 along the length of the lever arm 526 intersecting the surface of the brake pedal member 530.

A strain gauge 534 is preferably bonded to the material of the lever arm 526 in a position to sense strain in the lever arm 526 as force is applied to the brake pedal 106. The strain gauge 534 is of conventional structure and may be either of the metallic or semiconductor type. The strain gauge 534 is essentially a serpentine resistive path that will either elongate or shorten as strain is applied to the lever arm 526 thereby resulting in a change of resistance, which can be detected by an appropriate electrical circuit to be discussed below.

The brake pedal member 530 is a substantially L-shaped member which initially extends substantially downward from the force multiplier arms 519 and then extends substantially outward from the mounting plate 502 to where the brake pedal member 530 terminates in the brake pedal 106. The brake pedal 106 preferably is identical to typical brake pedals in real automobiles. The brake pedal member 530 is also fixedly connected to a pivot bearing member 538. The pivot bearing member 538 preferably comprises a metal cylinder which is horizontally mounted between two rectangular securing members 540 (one shown) which are mounted on the front side 505 of the mounting plate 502.

The mechanical operation of the ABS brake pedal system will now be described in conjunction with FIGS. 1 and 9. In response to conditions observed from the simulator 100, the user 102 places his foot upon the brake pedal 106 and depresses it in the same fashion as a driver would depress a brake pedal in an actual car. In response to the force resulting from the user 102 depressing the brake pedal 106, the brake pedal member 530 pivots about the pivot bearing member 538 in the direction of an arrow 542. This causes the segment of the brake pedal member 530 above the pivot bearing 538 to be urged to move in the direction depicted by an arrow 544. Since the segment of the brake pedal member 530 above the pivot bearing 538 is coupled to the force multiplier arms 519, the force multiplier arms 519 will also be urged to move in the direction of the arrow 544. Movement of the force multiplier arms 519 in the direction of the arrow 544 causes the connector rod 506 attached thereto to also move in the same direction, which is the positive X-direction in FIG. 9.

Since the connector rod 506 includes an attached washer 514 and nut 516, movement of the connector rod 506 in the direction of the arrow 544 also results in movement of the washer 514 and nut 516 in the positive X-direction. As the washer 514 is moved in the positive X-direction it compresses the spring 512, which in turn causes linearly increasing force to be exerted against the washer 514 in the negative X-direction. Eventually, the spring 512 will be compressed to the point where the washer 514 will make contact with the elastic bumper 510. At that point, greater force will be exerted against the washer 514 in the negative X-direction. When the user 102 stops depressing the brake pedal 106 in the direction of arrow 542, the spring 510 will push the washer 514 and the connector rod 506 in the negative X-direction to their initial position, which will in turn cause the force multiplier arms 519, the brake pedal member 530 and the brake pedal 106 to return to their initial undepressed position. As can be appreciated, the amount of force exerted by the spring 512 and the elastic bumper 510 in opposition to the user 102 depressing the brake pedal 106 in the direction of the arrow 542 can be adjusted by positioning the washer 514 at a different location along the connector rod 506 and securing it thereto with the nut 516.

Depression of the brake pedal 106 in the direction of arrow 542 in this manner also results in straining the lever arm 526 causing the serpentine resistive path of the strain gauge 534 to either shorten or lengthen thereby changing its measured resistance. The strain gauge 534 is electrically connected to the control process 120 of the computer 114 as shown in FIG. 1. As can be appreciated, additional electronic circuitry is required to translate the change in resistive value of the strain gauge 534 due to increased strain upon the lever arm 536 into an electronic signal that the computer 114 can utilize. Consequently, this embodiment of the invention includes a bridge/interface circuit 546 (see FIG. 1) of a type available in the marketplace. Generally, the resistance of the strain gauge 534 changes very little during strain of the material of the lever arm 526, hence, the bridge/interface circuit 546 includes bridge circuitry which may be used to detect the slight changes in the resistance of the strain gauge 534. Further, the bridge/interface circuit 546 also includes interface circuitry which will convert the analog bridge circuit output signal to a digital format suitable for use by the control process 120. As can be appreciated by one skilled in the relevant technology, one of the difficulties of using strain gauges, and particularly sensitive silicon based strain gauges, is that these gauges have temperature drift characteristics which result in inaccurate readings. It is desirable in the quiescent state when no strain is being experienced by the lever arm 526 that the bridge be balanced to minimize these effects.

Specifically, the presently preferred bridge/interface circuit is substantially the same as the circuit shown in FIG. 9 of U.S. Pat. No. 4,949,119 to Moncrief, et al. The desirability of using such a circuit was described in this patent at Column 7, lines 3–60 and the manner in which this circuit operated, both as a balancing bridge and as a analog to digital converter is described in detail at Column 9, line 16 to Column 10, line 32. U.S. Pat. No. 4,949,119 to Moncrief, et al., is hereby incorporated by reference.

The ABS brake pedal system 500, shown in FIG. 9, simulates the feeling the user 102 will feel through his foot when he is depressing the brake pedal 106 with sufficient force such that an ABS braking system would typically be activated in a real world automobile. As previously described, in this preferred embodiment, when the user 102 depresses the brake pedal 106, a strain will be induced upon the lever arm 526 which will then be detected by the strain gauge 534. The strain gauge 534 is coupled to the bridge/interface circuit 546 which detects and translates the signal detected by the strain gauge into a signal which can be processed by the computer 114, and specifically the control process 120.

If this signal indicates that the user 102 is depressing the brake pedal 106 with substantially the same amount of force that would activate a typical ABS brake system in real-world automobiles, the control process 120 sends a pulsating voltage signal to the solenoid 522. In response to this pulsating voltage, the solenoid 522 will cause the solenoid arms 521 to move back and forth in the positive and negative X-direction. This movement of the solenoid arms 521 causes the force multiplier arms 519 to vibrate. Since the force multiplier arms 519 are connected to the brake pedal member 530 which is in turn connected to the brake pedal 106, vibration of the force multiplier arms 519 will ultimately be felt by the user 102 as he depresses the brake pedal 106. As can be appreciated by a person skilled in the technology, the amplitude of this induced vibration of the force multiplier arms 519 can be controlled by tightening or loosening the adjustment screw 528 attached thereto. Consequently, by adjusting the screw 528, the vibration felt by the user 102 while depressing the brake pedal 106 can be made to approximate the feeling of an actual brake pedal in an actual ABS equipped car when the ABS brakes are being applied.

In this presently preferred embodiment, the control process 120 will continue to send the pulsating voltage to the solenoid 522 so long as the simulated vehicle is still moving and the user 102 is still depressing the brake pedal 106 with sufficient force to initiate the pulsating voltage.

Included in the Microfiche. Appendix is the source code, entitled abs.c, used by the control process 120 to implement the operation of the ABS system herein described. The pulsating voltage preferably has a 40 msec pulse width with a cycle period of 100 msec.

The embodiments of the invention here-in-above have several significant advantages over the prior art. Specifically, the simulation system that Applicant has disclosed is capable of generating and transmitting a wide variety of road feel cues to the user of the simulator. These road feel cues can be stored and recalled when an event occurs within the simulated universe which would normally trigger a specific road feel in a real world automobile, e.g. hitting a bump etc. and are transmitted to the user by a mechanism which can accommodate and transmit a large number of feelings.

Further, the simulation system that Applicant has disclosed also realistically represents the feel that the vehicle controls would have when operating in the real world. Specifically, the driving embodiment of the present invention includes a steering wheel with feedback as well as a brake pedal which simulates the feeling of ABS brakes. A simulation system with these features provides a more realistic representation of the real world, and a such, provides a better educational experience of how to operate this vehicle in the real world.

Although the above detailed description has shown, described and pointed out fundamental novel features of the invention as applied to the various embodiments discussed above, it will be understood that various omissions and substitutions and changes in the form and details of the device illustrated may be made by those skilled in the art, without departing from the spirit of the invention. The described embodiments are to be considered in all respects only as illustrative and not restrictive.

What is claimed is:

1. A low frequency sound system of a vehicle simulation system for simulating the physical sensation representative of the sensations produced during the operation of the simulated vehicle, comprising:

a seat, wherein a user of the simulated vehicle sits during operation of the simulated vehicle;

a plurality of input device corresponding to input devices of the vehicle simulated by the vehicle simulation system;

a computer for receiving input signals from the input devices;

a control process executed by the computer for selectively converting the input signals into a plurality of control output signals, wherein the plurality of control output signals correspond to a plurality of events occurring during operation of the simulated vehicle in simulated universe; and a transducer responsive to the control output signals for communicating a plurality of low frequency output signals to the seat, wherein each of the plurality of low frequency output signals produce a corresponding physical motion of the seat so as to provide the user with a physical sensation that corresponds to one of the plurality of events occurring during the operation of the simulated vehicle in the simulated universe.

2. A vehicle simulator for modeling physical sensations produced by occurrence of physical events during the operation of the simulated vehicle in the simulated universe, comprising:

a plurality of input devices for controlling the operation of a simulated vehicle;

a controller which receives signals from at least one of said plurality of input devices that direct said simulated vehicle through a simulated universe wherein at least one of said plurality of simulated physical events occur by said simulated vehicle in a simulated universe;

a computer, responsive to the controller, for determining position information of the simulated vehicle in said simulated universe and for providing a signal representing occurrence of a simulated physical events during operation of said simulated vehicle in said simulated universe; and a low frequency sound system, having a speaker positioned in the proximity to a user and responsive to the signal produced by the computer, for communicating a of frequency sound signal from the speaker which produces a physical sensation felt by the user that is representative of a sensation that said user would detect upon actual occurrence of the simulated physical event occurring during the operation of the simulated vehicle in the simulated universe.

3. A simulator as defined in claim 2, further comprising a surface positionable in physical contact with the user and responsive to the sound signal such that said surface communicates said physical sensation to said user.

4. A simulator as defined in claim 2, wherein the computer selects one of a plurality of sound signals stored in a memory in response to the determined position information, and provides the selected signal to the speaker of said low frequency sound system.

5. A simulator as defined in claim 4, further comprising a video display responsive to the signals from the computer for providing the user with a view of the simulated universe.

6. A simulation system for a user of a simulated vehicle for providing simulated physical sensations representative of the sensations produced during the operation of the simulated vehicle, comprising:

a plurality of simulated input devices for controlling the operation of the simulated vehicle;

modeling means responsive to the input devices for determining position information of the simulated vehicle in a simulated environment;

a video display for presenting the user with a view of the simulated environment as seen from said simulated vehicle; and means, responsive to the position information of the simulated vehicle in said simulated environment, for providing to the user a selected low frequency sound signal representing occurrence of a simulated physical event during operation of said simulated vehicle in said simulated environment, wherein said low frequency sound signal is selected from a plurality of low frequency sound signals stored in a signal storing means and wherein each of said low frequency sound signals is configured to produce a physical sensation that is sensed by the user and which is representative of a sensation produced during operation of a corresponding actual vehicle in a corresponding actual position and in a corresponding actual universe.

7. The simulation system of claim 6, wherein the low frequency sound signal providing means comprises:

means for processing the selected low frequency sound signal retrieved from the signal storing means; and means for transducing the selected low frequency sound signal received from the processing means into low frequency sound.

8. The simulation system of claim 7, wherein the plurality of low frequency sound signals include signals representative of the physical sensation of the simulated vehicle colliding with an object in the simulated evironment.

9. The simulation system of claim 7, wherein the plurality of low frequency sound signals comprises a plurality of digital signals and processing means comprises:

a digital to analog converter receiving the digital signals from the signal storing means;

a filter receiving analog signals from the converter; and an amplifier receiving a filtered signals from the filter.

10. The simulation system of claim 9, wherein the filter is a low pass filter.

11. The simulation system of claim 7, wherein the transducing means comprises:

a speaker providing an audio signal to a chamber; and a semi-rigid diaphragm connected to the chamber which vibrates in response to the audio signal.

12. The simulation system of claim 6, wherein the plurality of low frequency sound signals include signals representative of the physical sensation of the simulated vehicle colliding with objects in the simulated environment.

13. The simulation system of claim 12, wherein the simulated vehicle comprises an automobile equipped with an engine and the plurality of low frequency sound signals include signals representative of the physical sensation of the revving of the automobile engine.

14. A simulation system for a user of a simulated vehicle for providing simulated physical sensations representative of the sensations produced during the operation of the simulated vehicle, comprising:

a plurality of simulated input devices for controlling operation of the simulated vehicle in a simulated universe;

a computer, responsive to the plurality of simulated input devices, for determining position information of the simulated vehicle in the simulated universe and for providing a plurality of control signals at least in part in response to the position information of the simulated vehicle in the simulated universe;

a video display responsive to the plurality of control signals for providing the user with a view of the simulated universe as seen from the simulated vehicle; and a low frequency sound system, having a speaker positioned adjacent to the user for providing the user with low frequency sound signals that are configured to produce physical sensations experienced by the user which are representative of physical sensations that occur during operation of a corresponding actual vehicle in a corresponding actual universe, wherein the low frequency sound system responsive to the control signals selects one of a plurality of low frequency sound signals stored in the computer corresponding to the determined position information, and provides the selected signal to the speaker.

15. The simulation system of claim 14, wherein the simulated vehicle comprises an automobile and the plurality of simulated input devices includes a steering wheel, an accelerator pedal, a gear shift, and a brake pedal.

16. The simulation system of claim 14, wherein the plurality of stored low frequency sound signals include signals representative of the physical sensation produced by the simulated vehicle hitting a simulated object in the simulated universe.

17. The simulation system of claim 16, wherein the simulated vehicle comprises an automobile containing an engine and the plurality of stored low frequency sound signals representative of the physical sensation of the revving of the engine.

18. The simulation system of claim 14, wherein the vehicle simulator includes a seat mounted on a base for the user of the simulated vehicle.

19. The simulation system of claim 18, wherein the base includes an enclosure and the diaphragm of the speaker is positioned adjacent the enclosure so that when the speaker transmits a low frequency signal representative of a physical sensation produced by the operation of the simulated vehicle, the air contained within the enclosure is displaced causing the seat mounted on the base to vibrate.

20. The system of claim 18, wherein the seat includes an interior hollow enclosure located in the back of the seat, said hollow enclosure containing a bladder, and wherein the speaker is mounted in the back of the seat adjacent the bladder so that when the speaker transmits a low frequency signal representative of a physical sensation produced by the operation of the simulated vehicle, the air contained within the bladder is displaced causing the seat to vibrate.

21. A simulation system including a simulated vehicle for providing simulated physical sensations representative of the sensations produced during the operation of the simulated vehicle, the system comprising:

a plurality of simulated input devices for controlling the operation of the simulated vehicle;

a computer, responsive to the plurality of simulated input devices, for determining position information of the simulated vehicle in the simulated universe and for providing a plurality of control signals in response to the determined position information;

a video display, responsive to the plurality of control signals, for providing the user with a view of the simulated universe as seen from said simulated vehicle as the simulated vehicle moves through the simulated universe; and a low frequency sound feedback system, having a low frequency speaker positioned adjacent to the user for providing the user with low frequency sound signals producing a physical sensation representative of a physical sensation produced during operation of an actual vehicle in conditions corresponding to those influencing operation of the simulated vehicle in an actual universe, wherein the low frequency sound feedback system responsive to the control signals selects one of a plurality of low frequency sound signals stored in the computer corresponding to the determined position information and provides the selected signal to the low frequency speaker thereby producing the physical sensation.

22. The simulation system of claim 21, wherein the plurality of stored low frequency sound signals include signals representative of a physical sensation produced by the simulated vehicle hitting a simulated object in the simulated universe.

23. The simulation system of claim 21, wherein the simulated vehicle comprises an automobile containing an engine and the plurality of stored low frequency sound signals include signals representative of the physical sensation of the revving of the engine.

24. The simulation system of claim 21, wherein the vehicle simulator includes a seat mounted on a base for the user of the simulated vehicle.

25. The simulation system of claim 24, wherein the base includes an enclosure and the diaphragm of the low frequency speaker is positioned adjacent the enclosure so that when the low frequency speaker transmits a low frequency signal, the air contained within the enclosure is displaced causing the seat mounted on the base to vibrate.

26. The simulation system of claim 24, wherein the seat includes an interior hollow enclosure located in the back of the seat, said hollow enclosure containing a bladder, and wherein the low frequency speaker is mounted in the back of the seat adjacent to the bladder so that when the low frequency speaker transmits a low frequency signal, the air contained within the bladder is displaced causing the seat to vibrate.

* * * * *